United States Patent [19]

Suggs

[11] Patent Number: 5,079,753
[45] Date of Patent: Jan. 7, 1992

[54] DIVER ORIENTATION APPARATUS AND METHOD

[75] Inventor: Robert B. Suggs, New Iberia, La.

[73] Assignee: American Oilfield Divers, Inc., Broussard, La.

[21] Appl. No.: 658,706

[22] Filed: Feb. 21, 1991

[51] Int. Cl.$^5$ ............................................. G01S 15/89
[52] U.S. Cl. ..................................... 367/107; 367/87; 367/131; 367/910
[58] Field of Search .................. 367/3, 4, 87, 88, 107, 367/113, 131, 910, 118, 95, 96

[56] References Cited

U.S. PATENT DOCUMENTS

| | | | |
|---|---|---|---|
| 3,045,206 | 7/1962 | Ahrens et al. | 367/910 |
| 3,541,717 | 11/1970 | Grayson | 367/106 |
| 3,800,273 | 3/1974 | Rolle | 367/910 |
| 4,102,203 | 7/1978 | Sylvester et al. | 73/620 |

OTHER PUBLICATIONS

Saltzer, B.; "A Deep Submergence Divers' Navigation System," *Navigation*; Journal of the Institute of Navigation, vol. 17, #1, 1970.

*Primary Examiner*—Ian J. Lobo
*Attorney, Agent, or Firm*—Mason, Fenwick & Lawrence

[57] ABSTRACT

The present invention relates to a method and system for scanning a specified underwater area with sonar energy to generate sonar image signals of a submerged diver and othe objects within said underwater area, processing said sonar image signals at, for example, a remote station such as a surface vessel, whereby information is incorporated with said sonar image signals for designating a route from the starting underwater location of the diver to a particular underwater object, and transmitting said processed signals to an image monitor carried by the diver for providing him with visual directional information to assist him in going from his starting location to the location of the targeted object. Preferably, said directional information includes a route or heading line that the diver can follow on his monitor in moving toward the object.

25 Claims, 3 Drawing Sheets

DIVER ORIENTATION APPARATUS AND METHOD

FIELD OF THE INVENTION

The present invention relates to a method and system for providing visual aids to a diver underwater to enable him to locate submerged objects, especially when there is little or no visibility. The present invention is particularly but not exclusively useful in removing man-made objects from sea bottom sites of discontinued offshore oil or gas drilling operations, and also has general utility for many other underwater tasks such as locating submerged well head components and sunken vessels, as well as surveying submerged pipelines and directing the placement of platforms or mobile drilling units.

BACKGROUND OF THE INVENTION

Underwater diving operations for many purposes can be hampered by the lack of visibility due to the turbidity or depth of water in which the diver finds himself. This is especially true if the diver is attempting to locate submerged objects which are some distance away from his current position and cannot be seen. With zero or near zero visibility, a diver also can become confused and disoriented so that he does not know north, south or other directions.

One striking example of the problems encountered by a diver under such circumstances is when he is attempting to locate and remove various man-made objects or debris from the sea bottom sites of offshore oil or gas drilling or production operations that have been temporarily or permanently discontinued. Such bottom site clearance is mandated by federal regulations after offshore drilling or production activities cease at leased government sites on the outer continental shelf (OCS) of the United States. Local and foreign governments also quite often require bottom site clearance in connection with offshore drilling or other underwater activities.

The federal OCS site clearance requirement involves the removal of well heads, drilling rigs and production platforms which are no longer in service, along with other man-made objects including submerged debris on the ocean floor. A major reason for this removal is so that these objects will not conflict or interfere with other uses of the OCS such as shrimp fishing, where boats trawl for fish with nets that can become entangled with man made underwater obstructions. For example, objects or debris that may be found on sea bottom sites where oil or gas activities have been conducted include pipes, tires, batteries, wire rope, hoses, tools, gratings, plates and other structural shapes that have fallen off or have been thrown from platforms or from boats that transport equipment and personnel to and from such platforms. In addition, the stubs of severed platform legs may still project upward from the sea bottom even though such legs are required to be cut off below the mud-line when abandoned platforms are removed from the offshore sites.

When underwater visibility is zero or nearly so to a diver, one widely used search technique for locating and removing such objects from the sea bed has been to provide the diver with a search line of predetermined length, e.g., thirty feet, that is connected to a weight or other structure at a particular sea bed location within the site area to be cleared. The diver, who is usually weighted down, then walks in a circle while holding the line taut, after which another section of line may be added and a circle walked in the opposite direction. Objects that are discovered by visual sighting or by snagging the taut line can then be lifted aboard a surface vessel for eventual disposal on land. This circular procedure is repeated at other sea bed locations until the entire bottom site area has been covered. However, since a bottom site area to be cleared can encompass the area of a circle over 1300 feet in radius from the center of a drilling or production platform, it is apparent that a diver must expend a great deal of time and energy in walking many overlapping small circles while holding a taut line in order to completely traverse such a large site area. This is especially critical when a diver is working at 300 feet where the bottom time is limited to 30 minutes. The majority of oil or gas drilling and production activities are now conducted in this water depth in the Gulf of Mexico off the Texas/Louisiana coastline. The diver then must be brought to the surface in a controlled manner to avoid getting decompression sickness before diving again at some later time. Such interruptions substantially increase the duration of a site clearance operation.

Moreover, if the sea bottom is relatively soft or is overlaid by layers of silt, a diver often finds himself knee-deep in sand or mud while walking which can be physically exhausting. Bottom holes, depressions or other geographical features which cannot be seen also pose some danger to a diver if he unexpectedly encounters them.

Another current search technique is to place a sonar transmitter/receiver transducer on the sea bottom so that sonic waves reflected from the diver and other underwater objects are shown as echo images on a shipboard or other remote station monitor. Based on the location of these monitored images which represent the diver and objects to be recovered, a remote station operator then gives audio commands to the underwater diver via a telephone cable in an effort to guide or direct his movements to these objects. However, such remote audio guidance also has not proven to be particularly efficient either in diver time or effort because of the directional disorientation he experiences due to a lack of visibility.

A U.S. Pat. No. 3,045,206 (Ahrens et al) also shows the use of a self-contained sonic transducer/CRT device which is carried by a diver to help him locate underwater objects whose sonar images he views on the CRT screen that may be either outside or inside his helmet. However, the Ahrens device does not also permit the diver to view a sonar image of himself in relation to other object images, and it has other disadvantages in comparison with the subject invention, including an apparent need for the Ahrens diver also to consult a compass and level that he additionally carries. In U.S. Pat. No. 4,102,203 (Sylvester et al), the signals from an underwater ultrasonic testing transducer operated by a diver are transmitted to a remote station for analysis and visual display, from whence visual image test result signals are sent back to the diver for display on his own monitor; however, the Sylvester system is not designed for or capable of locating the position of underwater objects and directing the diver thereto Therefore, bottom site clearance in offshore oil and gas fields, as well as many other underwater tasks, have been very exhausting, time consuming and expensive operations when low or zero visibility prevents a diver from seeing and going directly to an underwater object. Until development of the subject invention, however, it has not been possible to give a diver any significant directional help in finding his way to underwater objects under such conditions.

SUMMARY OF THE PRESENT INVENTION

Accordingly, it is a primary purpose of the present invention to provide underwater visual aids to a diver for quickly and safely enabling him to locate submerged objects, including geographical features, when there is little or no underwater visibility.

Another purpose of the present invention is to provide a method and system whereby underwater sonar scanning presents a diver with a real time visual display of the direct and shortest route or path from his starting underwater location to a particular submerged object regardless of the lack of underwater visibility.

A further purpose of the present invention is to provide a method and system for generating underwater sonar information about the current location of a diver and other submerged objects, transmitting said sonar information to a remote station for processing, and visually displaying said processed sonar information to the diver for enabling him to follow the most direct route to a submerged targeted object.

These and other purposes of the present invention are achieved by scanning a specified underwater area with sonar energy to generate sonar image signals of a submerged diver and other objects within said underwater area, processing said sonar image signals at, for example, a remote station such as a surface vessel, whereby information is incorporated with said sonar image signals for designating a route from the starting underwater location of the diver to a particular underwater object, and transmitting said processed signals to an image monitor carried by the diver for providing him with visual directional information to assist him in going from his starting location to the location of the targeted object. Preferably, said directional information includes a route or heading line that the diver can follow on his monitor in moving toward the object.

DETAILED DESCRIPTION OF A PREFERRED EMBODIMENT

Figure 1:
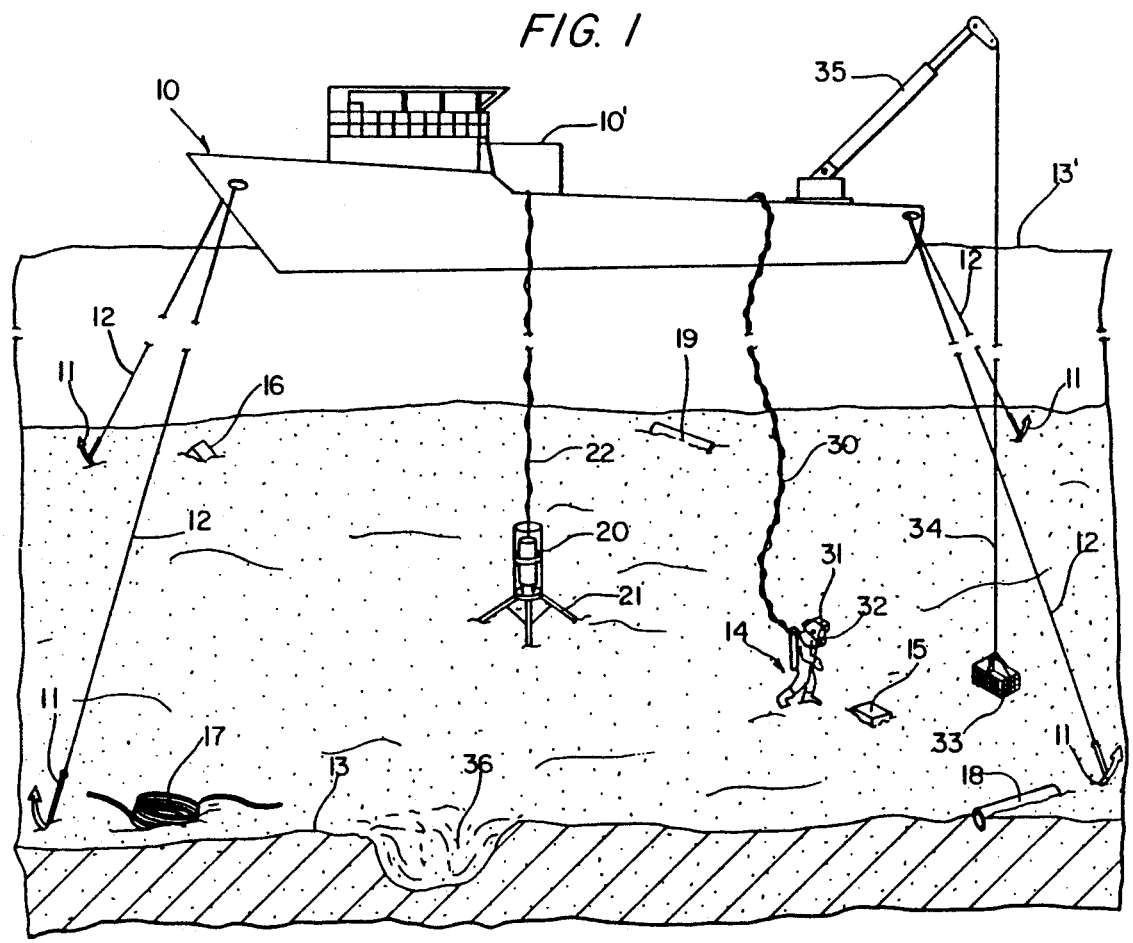
FIG. 1 is a diagrammatic perspective view of a surface vessel and an underwater diver during the process of clearing a sea bottom site according to the subject invention.

In describing the preferred embodiment of the subject invention illustrated in the drawings, specific terminology is used for the sake of clarity. However, the invention is not intended to be limited to the specific terms so selected, and each specific term includes all technical equivalent terms for steps or items operating in a similar manner to accomplish a similar purpose.

Figure 2:
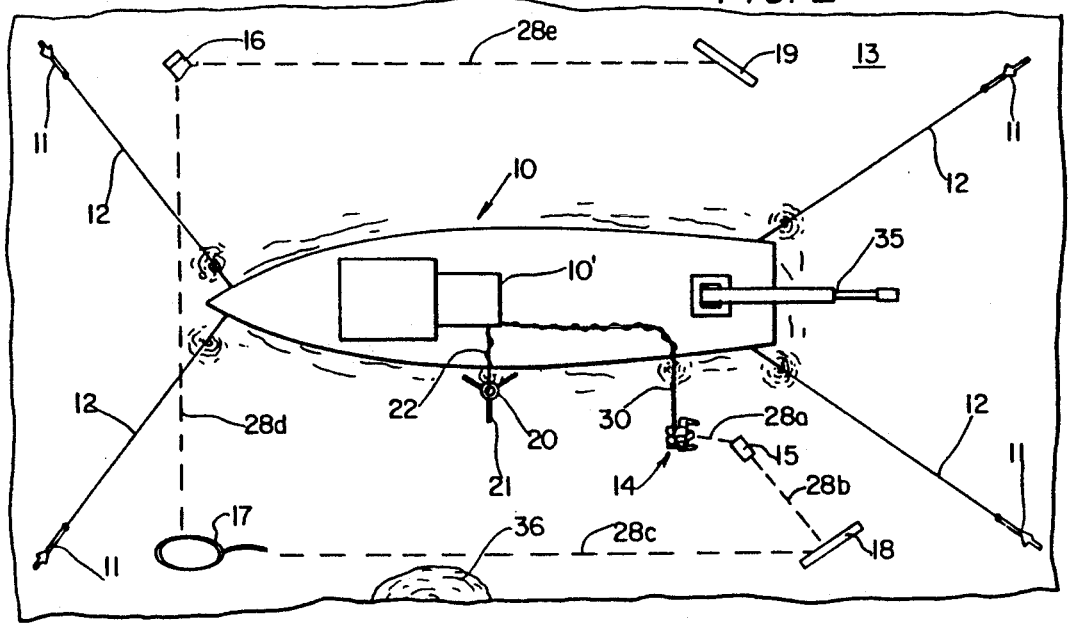
FIG. 2 is a diagrammatic plan view of the site depicted in FIG. 1.

FIGS. 1 and 2 illustrate one major use of the subject invention in clearing sea bottom areas of man-made objects and debris as, for example, is required by current federal regulations when drilling or production equipment on a leased government offshore site is abandoned or otherwise closed down. FIG. 1 is a diagrammatic perspective view and FIG. 2 is a diagrammatic plan view showing a surface vessel 10 which is fixed in place by four anchors 11 and their lines 12 extending from vessel 10 to the sea bottom 13. As is typical for many offshore drilling sites located miles from the Gulf of Mexico coastline, sea bottom 13 may be at a depth below the water surface 13' where human visibility on sea bottom 13 is virtually zero.

Also depicted in FIGS. 1 and 2 are various man-made objects lying on sea bed 13 that are assumed to have been deposited there as a result of drilling or production activities in the immediate vicinity. For example, this debris may include several batteries 15 and 16, a coil of wire rope 17, and various pipe segments 18 and 19 which fell from or were thrown off a platform (not shown) during earlier drilling or production operations.

In order to assist the diver 14 in locating and retrieving these man-made objects according to the present invention, an underwater scanning sonar transducer 20 is lowered from vessel 10 to sea bottom 13 where it rests, for example, on an appropriate tripod stand 21 that keeps the transducer in a fixed position on bottom 13. In some cases, however, transducer 20 may be suspended or otherwise located at some distance above sea bottom 13. Sonar transducer 20, which is electrically connected by a cable 22 to vessel 10, preferably should be able to horizontally scan or sweep 360° around its vertical axis so that its transmitted sonar energy beam will impinge on and reflect from diver 14 and other objects on bottom 13 at all points of the compass up to a range of about 100 meters. However, a sector scan of less than 360° may be permissible or appropriate for some tasks, as well as a lesser range. The reflected sonar beam is also preferably received by the same transducer 20 and there converted into electrical signals which are transmitted by a cable 22 to processing and other apparatus located, for example, in cabin 10' on board vessel 10.

Figure 3:
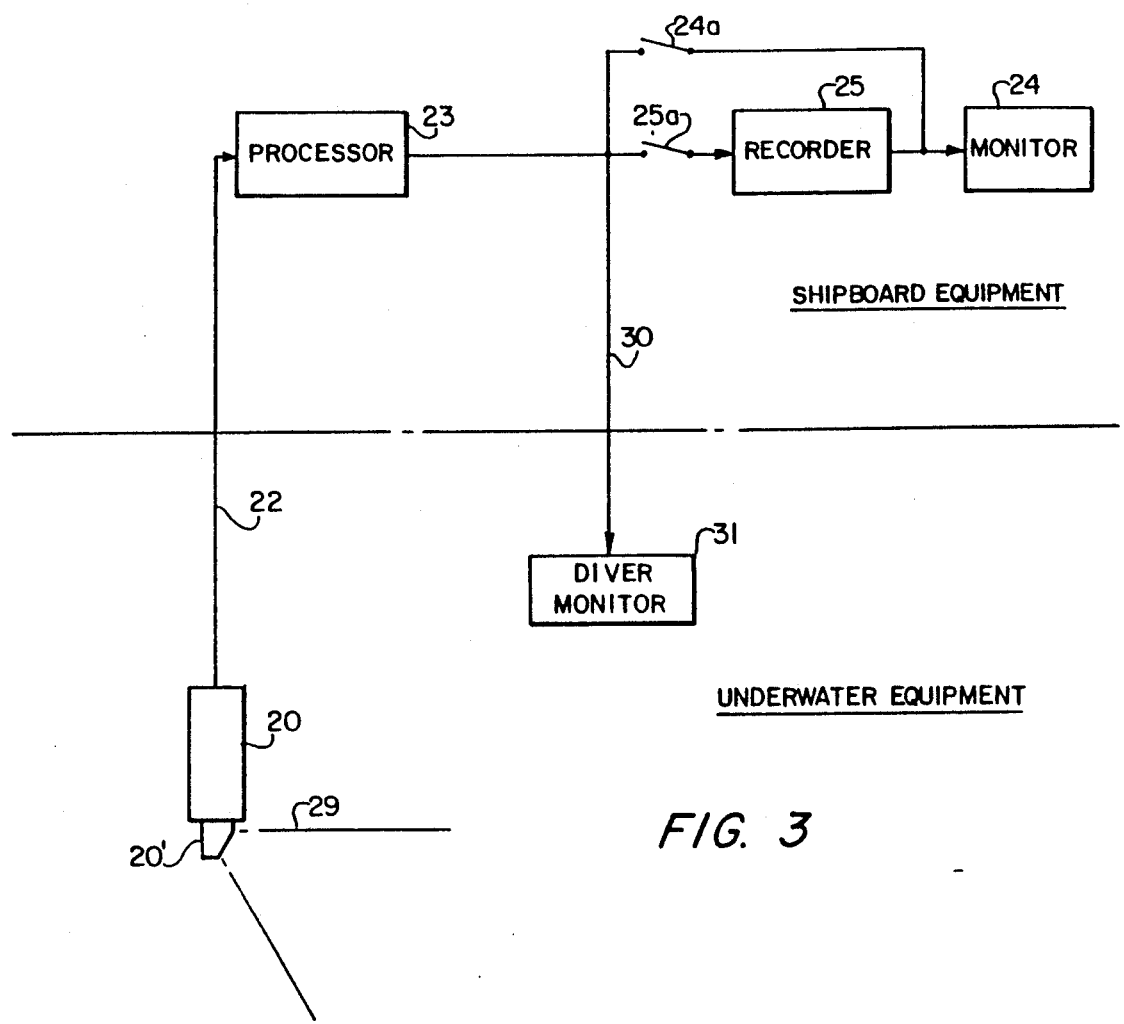
FIG. 3 is a schematic diagram of the shipboard remote station apparatus and the underwater devices used in the subject invention.
Figure 5A:
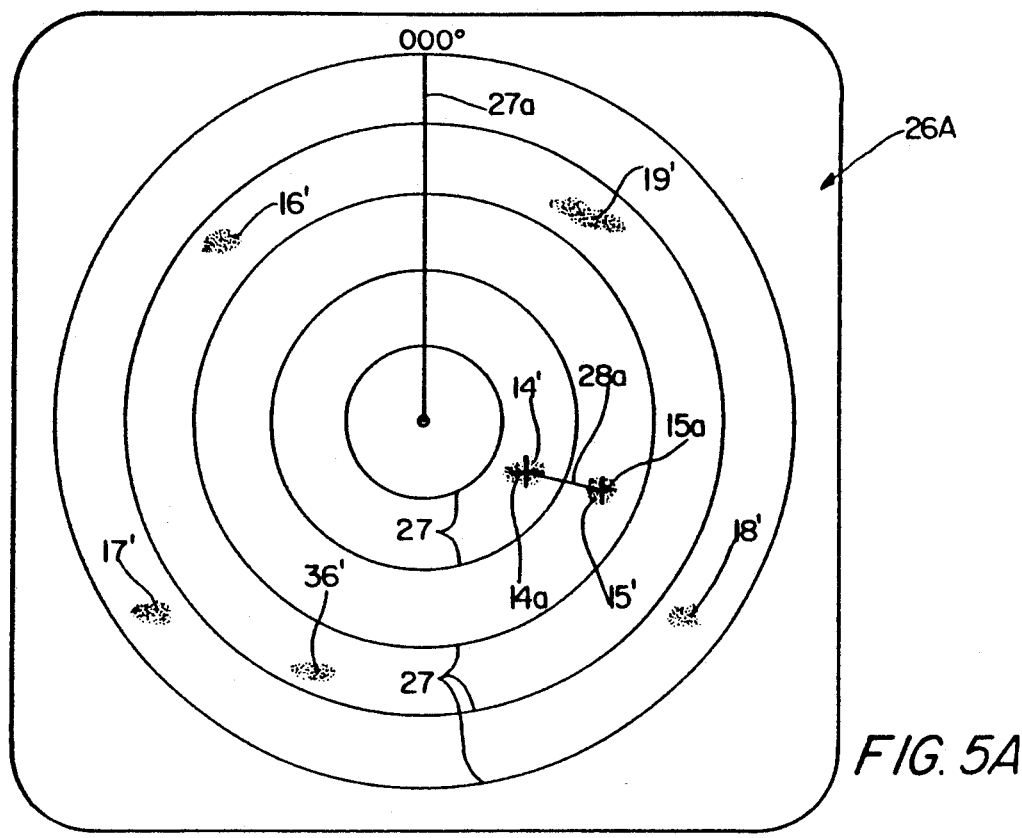
FIGS. 5A and 5B depict two different polar or plan view display images according to the subject invention which show the location of a diver and other underwater objects within the range of the scanning sonar beam.

FIG. 3 is a schematic diagram of this remote shipboard station apparatus, as well as showing its interconnection with the underwater devices used in the subject invention. A processor 23 receives the transducer 20 signals via cable 22 and generates a visual polar or plan view image on a monitor 24 via switch 24a that is generally equivalent to a radar plan position indicator display. If desired, the processor image output signals may also or alternatively be passed via switch 25a to a videotape or other type of recorder 25 in order to make a permanent record of the processor 23 output. The monitor polar or plan view display image 26A, as illustrated by FIG. 5A, contains spots or pips 14'-19' which respectively show the relative underwater locations of the diver 14 and all other objects 15-19 within the range of the underwater scanning sonar beam. The center or origin of image 26A represents the underwater location of transducer 20. Processor 23 also may add to image 26A a series of visible range circles 27, and a visible bearing or compass line 27a extending from the center of the image to any one of several compass points, e.g., to 000° as shown.

Further information is also displayed on sonar image 26A of FIG. 5A for the purpose of the present invention. By means of processor 23 at the remote shipboard station, an operator can add or incorporate another visible target heading or route line 28a between the displayed monitor screen position of diver pip 14' at his starting underwater location and the displayed position of any other pip representing a particular underwater object to which the diver is directed. Line 28a thus represents the most direct path or route that the diver can take to reach a target object from his starting location, and this heading or route line 28a remains fixed in place on image 26A while the diver moves toward this object. Although FIG. 5A shows this target heading line 28a as being connected between diver pip 14' and the battery pip 15', which is closest to pip 14' at this given point in time, line 28a instead could be added between diver pip 14' and any other object pip shown on the monitor screen, as specified by the remote station operator.

Additionally, the remote station operator at processor 23 also can superimpose a visible cursor or marker symbol 14a on diver pip 14' of any appropriate size and shape (here shown as a small cross in FIG. 5A), and he can further superimpose a similar or different visible cursor 15a on the target object pip 15' at the other end of target route line 28a. Cursors 14a and 15a thus visibly mark or highlight the diver pip and the target object pip from other object pips on the sonar image 26A. As the diver image pip 14' thereafter moves in response to subsequent movement of diver 14 from his starting location, however, both cursor 14a and route line 28a remain fixed in place on sonar image 26A. Thus, if for any reason the diver moves away from route line 28a as he is attempting to move to the target object, such digression from the path will be immediately apparent from a monitor on the diver's helmet and he can make a corrective turn back toward the path, as is later described in more detail.

Figure 4:
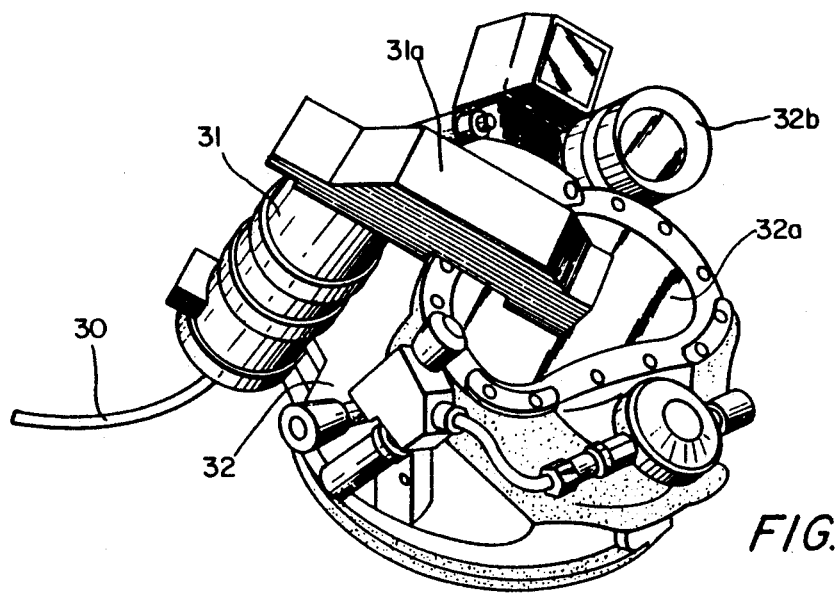
FIG. 4 is a perspective view of a diving helmet with a small visual display monitor mounted thereon.

Commercially available sonar apparatus which has been found particularly suitable for use in the subject invention is the Model 971 Color Imaging Sonar System manufactured by Mesotech Systems of Port Coquitlan, B.C., Canada. In particular, components of this Mesotech system include the 971 rotary scanning sonar head to which is attached a standard 971 sonar transmitter/receiver transducer (components 20 and 20' in FIG. 3), the 971 standard processor (component 23 in FIG. 3), a video monitor (component 24 in FIG. 3) and a video tape recorder (component 25 in FIG. 3). The Mesotech 971 standard transducer beam 29 is generally shown in FIG. 3 and has a range of about 100 meters. The Mesotech 971 processor also has the capability of generating two monitor on-screen cursors, one for each of two screen-displayed object images, together with a screen-displayed line joining or interconnecting said cursors, as well as providing an indication of the distance separating these two objects and the bearing of the line joining the cursors. Other suitable sonar systems are also available for use in the present invention The sonar polar image 26A of FIG. 5A is also transmitted via electrical cable 30 to a small closed circuit video monitor 31 mounted on the outside of helmet 32 of diver 14, as diagrammatically shown in FIG. 1 and in the perspective view of FIG. 4. Thus, the same sonar image 26A of FIG. 5A appears on helmet monitor 31 as appears on the remote monitor 24. By means of a folding mirror or prism arrangement 31a on helmet 32, this image 26A displayed on helmet monitor 31 can be viewed by the diver through the helmet glass window 32a. Helmet 32, with its attached monitor 31 and viewing prism arrangement 31a, has been previously used in connection with other underwater diving activities, including the practice of the underwater ultrasonic testing method disclosed in the aforementioned U.S. Pat. No. 4,102,203. If desired, a small television camera 32b may also be mounted o helmet 32 to permit the remote station operator to observe what the diver is doing.

Thus, diver 14 can see from image 26A on his monitor 31 where he is located with respect to the other displayed objects, particularly the target object 15 whose pip 15' is highlighted by cursor 15a. As the diver now begins to walk or move along sea bottom 13 from his starting location, he also can observe movement of his image pip 14'. The diver's objective, therefore, is to move in a direction from his starting location such that his image pip 14' follows the fixed target heading or route line 28a to pip 15' as marked by cursor 15a. If his pip 14' departs from line 28a, the diver knows that he is no longer on a direct route or path to the target object 15 and thus must take corrective action to return to this path by changing direction so that pip 14' once again lies on line 28a and moves toward pip 15'. The dotted line 28a in FIG. 2 also represents the direct route to be followed by diver 14 from his initial starting location to object 15.

Therefore, diver 14 can locate and reach the targeted battery object 15 with a minimum of time and effort. A basket or container 33 (or grappling equipment if needed) then can be lowered by boom 34 and cable 33 from vessel 10 (as shown in FIG. 1) to raise the object from the bottom. By mounting monitor 31 on diver's helmet 32, both hands of the diver are also free to put small objects into basket 33 or to perform other tasks.

Figure 5B:
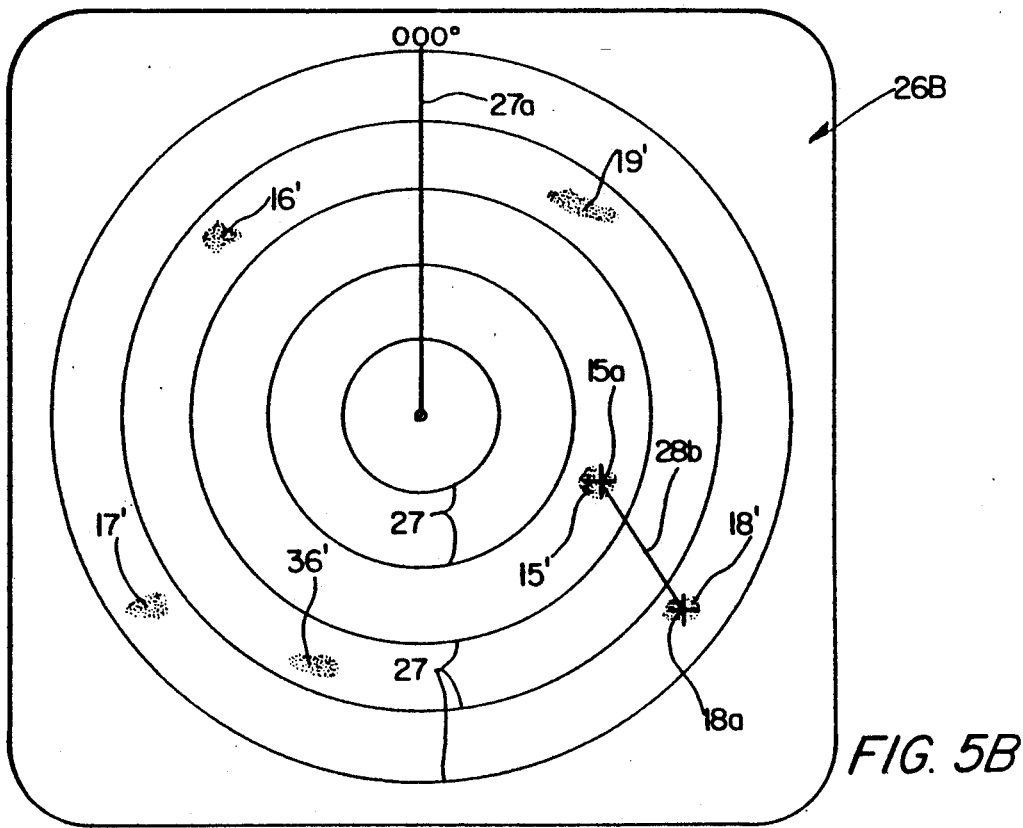

After the first target object, e.g., battery 15, has been reached by the diver, his image pip 14' occupies the same position on sonar image 26A as does the object pip 15' which then disappears from the image 26A if object 15 is raised to vessel 10. If the diver can safely remain below for an additional period of time, the remote station operator now may adjust processor 23 to eliminate target heading or route line 28a on image 26A and add a new target route line 28b which extends in fixed relationship from this new starting position of diver pip 14' to the image pip of another object to be located and reached by the diver, e.g., pip 18' which represents pipe segment 18. Sonar image 26B in FIG. 5B depicts this changed position of the diver image pip 14', as well as the newly added target route line 28b. Cursors 14a and 18a also are superimposed by processor 23 and the remote operator on pips 14' and 18' of image 26B to mark or highlight these pips from the remaining object pips. The diver 14 again begins to move from his new starting underwater location so that his image pip 14' follows this newly added target heading or route line 28b to pip 18'. Dotted line 28b in FIG. 2 also shows the actual route taken by diver 14 along the sea bottom to the target pipe object 18.

The above described procedure may then be repeated for the remaining object pips 17', 16' and 19' until the scanned bottom area has been cleared of all man-made objects. The dotted lines 28c, 28d and 28e in FIG. 2 depict the remaining routes taken in this order by diver 14 to accomplish this bottom clearance if he has enough time to do so before needing to surface. Otherwise, he may be required to ascend for a period of time before diving again near one of the remaining objects to resume the clearance operation. If the entire bottom site area to be cleared exceeds the range of sonar transducer 20, then vessel 10 and transducer 20 are moved to a new mooring location so that the diver ca continue clearing objects from another section of the site. Of course, bottoms of lakes, rivers and other bodies of water may similarly be cleared and the remote station also may be located on shore or elsewhere than on a surface vessel.

The method and apparatus described herein may also be used for purposes other than clearing underwater bottom sites of man-made objects and debris. For example, scanning sonar of the type described is also able to return echo signals from other kinds of objects such as depressions or holes in a sea bottom area where platform legs were once located, as represented by a bottom depression or hole 36 in FIGS. 1 and 2 and by pips 36' in FIGS. 5A and 5B. If it is desired to resume drilling or production over this bottom area at some future time, the legs of a new platform or jack-up rig may have to be set into the sea bottom so as to avoid hitting this earlier formed leg hole 36. Thus, it may be necessary for a diver to proceed to the vicinity of holes 36 to help guide the placement of new platform legs nearby. The method and apparatus of the subject invention will enable him to do so in the same way that man-made objects can be easily located by him. Moreover, by displaying sonar images of man-made or naturally formed bottom holes to the diver during site clearance or other underwater operations, such operations are made safer for the diver because he will be forewarned of their existence when walking on the bottom. Additional types of objects, such as other underwater geographical features, may also be located by a diver using the present invention.

There may also be some situations where the water depth is so great that a diver must descend in a diving bell before emerging therefrom to perform an underwater task such as, for example, adjusting a pipeline valve or inspecting a wreck that he cannot see from the diving bell. In this case, the diving bell itself may carry the scanning sonar transducer whose beam is reflected from the diver and from the task object for use by a remote operator and the diver in the aforedescribed manner to help the latter locate and reach the object in an efficient and safe way.

Thus, the method and system of the subject invention are not restricted to the cleanup of underwater oil or gas field debris, but have many other applications where it is necessary to locate objects such as man-made items or geographical features that a diver or a group of divers cannot see because of limited underwater visibility. Moreover, displayed routes and object cursors, while extremely beneficial, may not be needed in all applications for the diver to follow a path from his starting location to the target object, and displayed routes themselves may take forms other than a straight line. Computer-generated symbols or other indicators may also replace sonar object images for the purpose of displaying to the diver his underwater location and the location of other objects. Additionally, processor apparatus carried by the diver may be feasible for certain applications in order to avoid the need for a remote station.

Many modifications and variations of the present invention are possible considering the above teachings and specifications. Therefore, within the scope of the appended claims, the invention may be practiced otherwise than as specifically described above.

I claim:

1. A method of providing visual aids to a diver in an underwater area for enabling said diver to locate submerged objects within said area, comprising the steps of:
    (a) scanning said underwater area with sonar energy to generate sonar image signals of said diver and of said other submerged objects within said area, which represent the relative underwater locations of said diver and said other objects;
    (b) transmitting said sonar image signals to a remote station where they are processed and incorporated with other signals which indicate a route between the starting underwater location of said diver and the underwater location of a particular submerged object; and
    (c) transmitting said processed sonar image signals and said route signals from said remote station to said diver where they are converted to visual images which are displayed to said diver.

2. The method according to claim 1, wherein said visual route image is displayed to said diver as a straight line.

3. The method according to claim 1, which further includes the step of visually marking the displayed sonar image of said particular submerged object.

4. The method according to claim 3, wherein said visual route image is displayed to said diver as a straight line.

5. A system to provide visual aids to a diver in an underwater area for enabling said diver to locate submerged objects within said area, comprising:
    (a) means for scanning said underwater area with sonar energy to generate sonar image signals of said diver and of said other submerged objects within said area, which represent the relative underwater locations of said diver and said other objects;
    (b) processor means connected to said scanning means for processing said sonar image signals and incorporating them with other signals which indicate a route between a starting underwater location of said diver and the underwater location of a particular submerged object; and
    (c) monitor means carried by said diver and connected to said processor means for converting said processed sonar image signals and said route signals to visual images which are displayed on said monitor means to said diver.

6. The system according to claim 5, wherein said visual route image is displayed on said monitor means as a straight line.

7. The system according to claim 5, wherein said processor means further provides cursor signals to said diver monitor means which visually mark the displayed sonar image of said particular submerged object.

8. The system according to claim 7, wherein said visual route image is displayed on said monitor means as a straight line.

9. A system to provide visual aids to a diver in an underwater area for enabling said diver to locate submerged objects within said area, comprising:
    (a) means for scanning said underwater area with sonar energy to generate sonar image signals of said diver and of said other submerged objects within said area, which represent the relative underwater locations of said diver and said other objects;

(b) means for transmitting said sonar image signals to a remote station;

(c) processor means at said remote station for processing said sonar image signals and incorporating them with other signals which indicate a route between a starting underwater location of said diver and the underwater location of a particular submerged object;

(d) means at said remote station for transmitting said processed sonar image signals and said route signals to said diver; and (e) monitor means carried by said diver for receiving said processed sonar image signals and said route signals for converting them to visual images which are displayed on said monitor means to said diver.

10. The system according to claim 9, wherein said visual route image is displayed on said monitor means as a straight line.

11. The system according to claim 9, wherein said processor means further provides cursor signals to said diver monitor means which visually mark the displayed sonar image of said particular submerged object.

12. The system according to claim 11, wherein said visual route image is displayed on said monitor means as a straight line.

13. The system according to claim 12, wherein said remote station further includes monitor means connected to said processor means for displaying the same visual images as are displayed by said diver monitor means.

14. The system according to claim 13, wherein said scanning means includes a sonar transmitter/receiver transducer which is located on the bottom of said underwater area and scans around a vertical axis.

15. The system according to claim 14, wherein said visual images are shown as a plan view display on said diver monitor means and said remote station monitor means.

16. The system according to claim 9, wherein said processor means further provides cursor signals to said diver monitor means which visually mark the displayed sonar image of said particular submerged object and visually mark the displayed sonar image of said diver at his starting underwater location.

17. The system according to claim 5, wherein said scanning means includes a sonar transmitter/receiver transducer which is located on the bottom of said underwater area and scans around a vertical axis.

18. The system according to claim 5, wherein said visual images are shown as a plan view display on said monitor means.

19. The system according to claim 5, wherein said processor means further provides cursor signals to said diver monitor means which visually mark the displayed sonar image of said particular submerged object and visually mark the displayed sonar image of said diver at his starting underwater location.

20. A method for providing visual aids to a diver in an underwater area for enabling said diver to locate submerged objects within said area, comprising the steps of:

(a) scanning said underwater area with a beam of energy to generate visible indicators of the relative underwater locations of said diver and said other submerged objects within said area;

(b) displaying said visible location indicators to said diver; and (c) visually displaying to said diver a route between the displayed position of said diver location indicator at his starting underwater location and the displayed location indicator of a particular submerged object.

21. The method according to claim 20, wherein said route is displayed to said diver as a straight line.

22. A method of providing visual aids to a diver in an underwater area for enabling said diver to locate submerged objects within said area, comprising the steps of:

(a) scanning said underwater area with sonar energy to generate visible sonar images of said diver and said other submerged objects within said area, which represent the relative underwater locations of said diver and said other objects;

(b) displaying said visible sonar images to said diver; and (c) visually displaying to said diver a route between the displayed position of said diver sonar image at his starting underwater location and the displayed sonar image of a particular submerged object.

23. The method according to claim 22, wherein said route is displayed to said diver as a straight line.

24. The method of providing visual aids to a diver in an underwater area for enabling said diver to locate submerged objects within said area, comprising the steps of:

(a) scanning said underwater area with sonar energy to generate visible sonar images of said diver and said other submerged objects within said area, which represent the relative underwater locations of said diver and said other objects;

(b) displaying said visible sonar images of said diver;

(c) visually marking the displayed sonar image of said particular submerged object; and (d) visually displaying to said diver a route between the displayed position of said diver sonar image at his starting underwater location and said displayed marked sonar image of said particular submerged object.

25. The method according to claim 24, wherein said route is displayed to said diver as a straight line.

* * * * *